United States Patent
Edwards et al.

(10) Patent No.: US 8,010,821 B2
(45) Date of Patent: Aug. 30, 2011

(54) SYSTEMS AND METHODS FOR WAKE ON EVENT IN A NETWORK

(75) Inventors: Jim Edwards, Portland, OR (US); John C Weast, Porland, OR (US); Gunner D Danneels, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1014 days.

(21) Appl. No.: 11/901,928

(22) Filed: Sep. 19, 2007

(65) Prior Publication Data

US 2009/0077347 A1 Mar. 19, 2009

(51) Int. Cl.
*G06F 1/00* (2006.01)
(52) U.S. Cl. .......................... 713/324; 713/320
(58) Field of Classification Search .................. 713/320, 713/324
See application file for complete search history.

(56) References Cited

U.S. PATENT DOCUMENTS

| | | | |
|---|---|---|---|
| 5,802,305 A * | 9/1998 | McKaughan et al. | 709/227 |
| 6,513,128 B1 * | 1/2003 | Wang et al. | 713/600 |
| 7,233,792 B2 * | 6/2007 | Chang | 455/422.1 |
| 7,398,408 B2 * | 7/2008 | Paljug | 713/323 |
| 2004/0100923 A1 * | 5/2004 | Yam | 370/328 |
| 2004/0219955 A1 * | 11/2004 | daCosta | 455/574 |
| 2008/0082708 A1 * | 4/2008 | Wong et al. | 710/111 |
| 2008/0155247 A1 * | 6/2008 | Zimmer et al. | 713/2 |
| 2008/0240135 A1 * | 10/2008 | Weast | 370/402 |

* cited by examiner

*Primary Examiner* — Chun Cao
(74) *Attorney, Agent, or Firm* — Schubert Law Group PLLC; Jeffrey S. Schubert

(57) ABSTRACT

Embodiments include systems and methods for allowing a host CPU to sleep while service presence packets and responses to search requests are sent by an alternate processor. While the CPU is in a low power state, the alternate processor monitors the network for incoming request packets. Also, while the CPU is asleep, the alternate processor periodically may transmit presence packets, announcing the presence of a service available from the host system of the CPU. In one embodiment, the alternate processor is a low power processor. If a search request is received when the CPU is in a low power state, the alternate processor responds to the search request according to whether the PC provides that service. If a service request is received, then the ME wakes the CPU of the PC to provide the requested service. In the wireless case, when the CPU is asleep, portions of the wireless upper MAC are implemented by the ME. When the CPU is awake the wireless upper MAC is implemented in the CPU. Thus, embodiments enable the PC to appear available to wireless devices when the CPU is asleep.

15 Claims, 4 Drawing Sheets

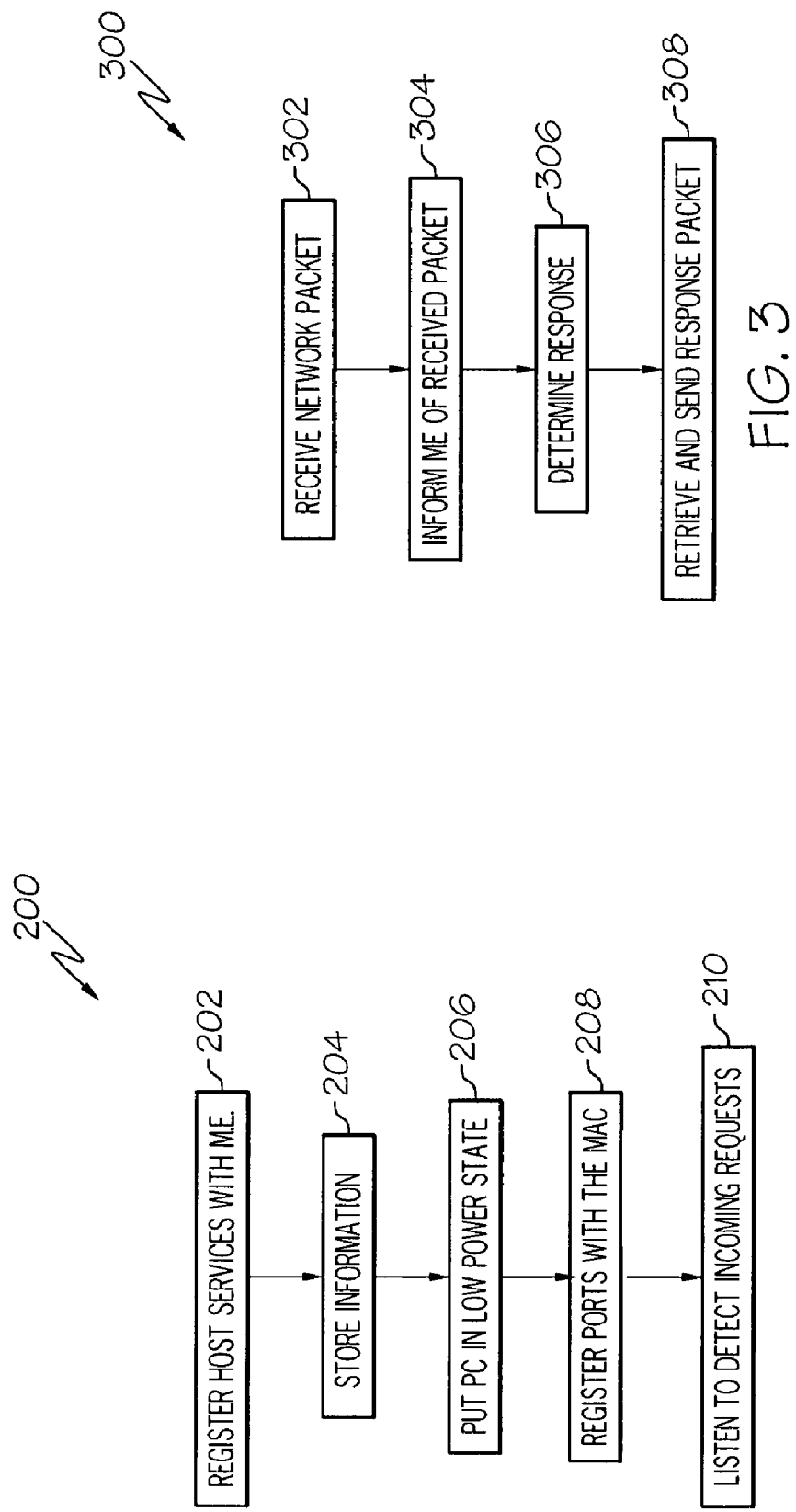

SYSTEMS AND METHODS FOR WAKE ON EVENT IN A NETWORK

FIELD

The present invention is in the field of network communications in a wireless computing environment. More particularly, the invention is in the field of a computing system responding to network requests.

BACKGROUND

Systems or devices in a network of computers will frequently send out search requests to identify whether a computing system on the network provides a service named in the search request. When a search request is received by a computing system that provides that service, the computing system sends in reply a response message indicating that the service is available. Moreover, some computer systems periodically advertise their services, say once every 5 minutes for example. Typically, in a busy network, search requests are so numerous that the CPU (Central Processing Unit) of the responding computing system must very frequently send a response packet in response to a request. This conflicts with the goal of trying to keep the CPU of the computing system in a low power state when not in use to conserve power.

BRIEF DESCRIPTION OF THE DRAWINGS

Aspects of the invention will become apparent upon reading the following detailed description and upon reference to the accompanying drawings in which like references may indicate similar elements:

FIG. 2 depicts a flow chart of an embodiment for putting the host PC (Personal Computer) to sleep and keeping the ME (Manageability Engine) awake to monitor requests.

FIG. 3 depicts a flow chart of an embodiment for responding to network requests while the host PC is asleep.

DETAILED DESCRIPTION OF EMBODIMENTS

Figure 1A:
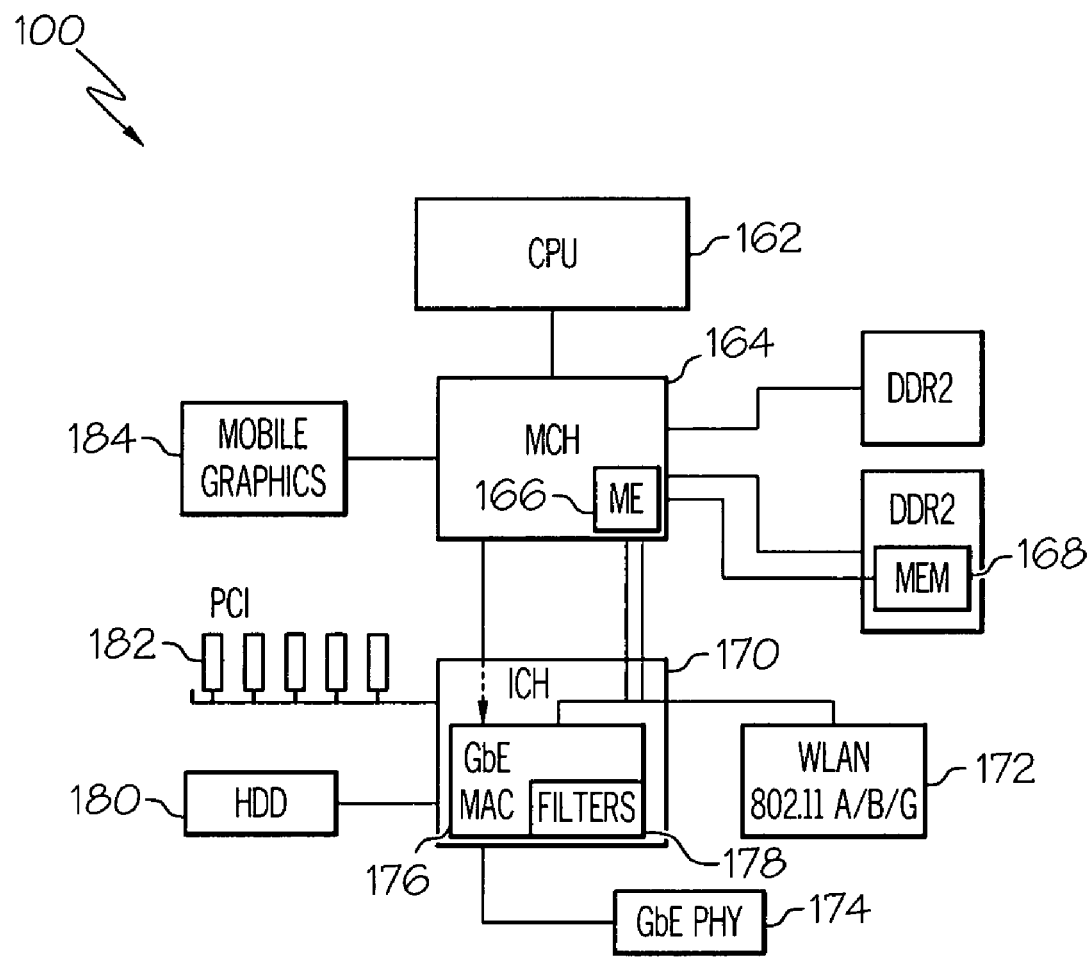
FIG. 1A depicts an embodiment of a computing platform with a processor and subprocessor.

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for allowing a host CPU to sleep while service presence packets and responses to search requests are sent by an alternate processor. While the CPU is in a low power state, the alternate processor monitors the network for incoming request packets. Also, while the CPU is asleep, the alternate processor periodically may transmit presence packets, announcing the presence of a service available from the host system of the CPU.

In one embodiment, the alternate processor is a low power processor. If a search request is received when the CPU is in a low power state, the alternate processor responds to the search request according to whether the PC provides that service. If a service request is received, then the ME wakes the CPU of the PC to provide the requested service. In the wireless case, when the CPU is asleep, portions of the wireless upper MAC are implemented by the ME. When the CPU is awake the wireless upper MAC is implemented in the CPU. Thus, embodiments enable the PC to appear available to wireless devices when the CPU is asleep.

Although some embodiments encompass wireless systems, some embodiments may be wireline. The wireless communication systems described and discussed herein are intended to represent any of a wide variety of wireless systems which may include without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc.

Intel's Digital Office and Digital Home organizations are building unique new usages that allow the PC to maintain network and service state even while the PC is in a low power state. A goal is to provide systems and methods whereby a PC can respond to incoming network requests even while the PC is in a low power state, to create the illusion that the PC and its services are fully operational and available on the network. Prior art PCs would be required to remain on all the time in order to maintain service aliveness. Embodiments described herein allow the PC to be placed into a low power state at all times unless it is being used. Analysis of power consumption for typical PC's shows that some embodiments may provide a power savings of over 75% over leaving the PC fully powered; this translates to over $70-100/year in reduced electricity cost per PC based on typical home usage patterns. Thus, present embodiments of computers described herein conserve power while still acknowledging their services in response to search requests.

Embodiments may use Intel's Active Management Technology (AMT). AMT includes a sub processor, called the Manageability Engine (ME), which can remain powered and fully functioning even when the PC is in a low power state. FIG. 1A shows an embodiment of a PC system for responding to network requests. The embodiment comprises a CPU 162 of a computer 100. CPU 162 can remain powered down when not in use, leaving management of responding to network requests to the ME 166. ME 166 is a subprocessor. ME 166 resides in the MCH (Memory Controller Hub) 164. MCH 164 controls access to memory and controls memory mapping. MCH 164 also provides connectivity to a mobile graphics unit 184 and memory 168. Memory 168 may have one area of memory dedicated to storing data and instructions for CPU 162 and another area of memory for storing instructions and data for ME 166.

ME 166 connects to both the primary Host CPU 162 and I/O (Input/Output) Controller Hub (ICH) 170, which gives ME 166 unique access to receive instructions from Host CPU 162, to wake the Host CPU, as well as to communicate with a LAN controller of ICH 170. The LAN controller has the ability to filter, by way of filters 178, for incoming packets on registered ports. When an incoming packet is received, the LAN controller can wake up the ME from a low power state to an active state. Thus, in one embodiment, when the PC is in a low power state (asleep), the ME is fully awake at all times. In some embodiments, both the PC and the ME can be asleep when the ME is not handling search requests. In some embodiments, the LAN controller stores the incoming packet so that it may be evaluated when the ME or the host PC is awakened. In other embodiments, the incoming packet is stored by the ME in memory 168.

ICH 170 also comprises a Giga bit Ethernet (GbE) MAC (Media Access Control) 176 which performs the function of media access control in connection with GbE physical layer 174. A Wireless Local Area Network (WLAN) driver 172, compliant with Institute of Electrical and Electronics Engineers (IEEE) standard 802.11, provides wireless connectivity to other components with wireless transceivers. ICH 110 also provides connectivity to a hard disk drive 180 (when the PC is awake) and Peripheral Component Interface (PCI) 182.

In prior art applications, the ME may perform a variety of functions including, for example, acting as a Trusted Platform Module (TPM). Embodiments such as shown in FIG. 1A find a new use for ME 166 to perform subordinate operations on behalf of the Host CPU 162 when the rest of the system is in a low power state. In doing so, we can make it appear that the Host PC and its services are fully available and powered on, when in fact they are not.

Many network service protocols, such as Universal Plug and Play (UPnP) define a mechanism for the search and discovery of services on a network. UPnP sends a search packet on a well defined multicast group and port number. Responses to the search packet are also well known and vary only slightly based upon differing forms of the initial search request. Responses to UPnP searches are required to be sent within a very small number of seconds (typically less than 5); otherwise the service is assumed to be unavailable. This is key, as it means the Host PC cannot be woken up to respond to these requests when received, as it would take too long to resume from the low power state before the response could be sent. Also, the host PC must periodically transmit service presence packets. To enable these functions when the PC is asleep, embodiments use the AMT Manageability Engine 166 to maintain service aliveness by responding to search requests and sending service presence packets without booting the Host PC.

Accordingly, some embodiments comprise a computer with a CPU that remains in a low power state when not in use and a Manageability Engine (subprocessor) that receives and responds to network service search requests while the CPU is in a low power state. Thus, one embodiment is a computer system appearing available to other systems in a network when a Central Processing Unit (CPU) of the computer system is in a low power state. The embodiment comprises a CPU that can be placed in a low power state. Other components such as the hard drive, USB ports and PCIs may also be placed in a low power state. The embodiment also comprises a subprocessor, located separately from the CPU, that implements functions to enable the subprocessor to respond to incoming network request packets when the CPU is in the low power state. In the case of wireless communications, the subprocessor implements an upper level of media access control. The subprocessor, which in some embodiments is located separately from the CPU but within the computer system, implements functions to enable the subprocessor to respond to incoming network service search request packets when the CPU is in the low power state; wherein a service search request packet is a request to identify whether a service is provided by a device on the network and wherein a response acknowledges the availability of the searched-for service. The subprocessor also periodically transmits advertisements (service availability packets) on behalf of the CPU host system, thereby creating the illusion that the host system CPU is awake. The embodiment may further comprise memory exclusively reserved for storage of data for the subprocessor, the data including software executed by the subprocessor.

The functions implemented in the subprocessor comprise monitoring different input/output (I/O) ports of the computer system. The functions implemented in the subprocessor comprise evaluating requests to determine if a response can be sent by the subprocessor without waking the CPU and peripheral devices from the low power state to a higher power state. Evaluating requests to determine if a response can be sent without waking the CPU comprises determining if the request is for data that can be accessed without waking the CPU. If the subprocessor determines that a response cannot be sent without waking the CPU, then the subprocessor wakes the CPU from the low power state to a higher power state. In the wireless case, the subprocessor further transfers media access control from the subprocessor to the CPU.

Figure 1B:
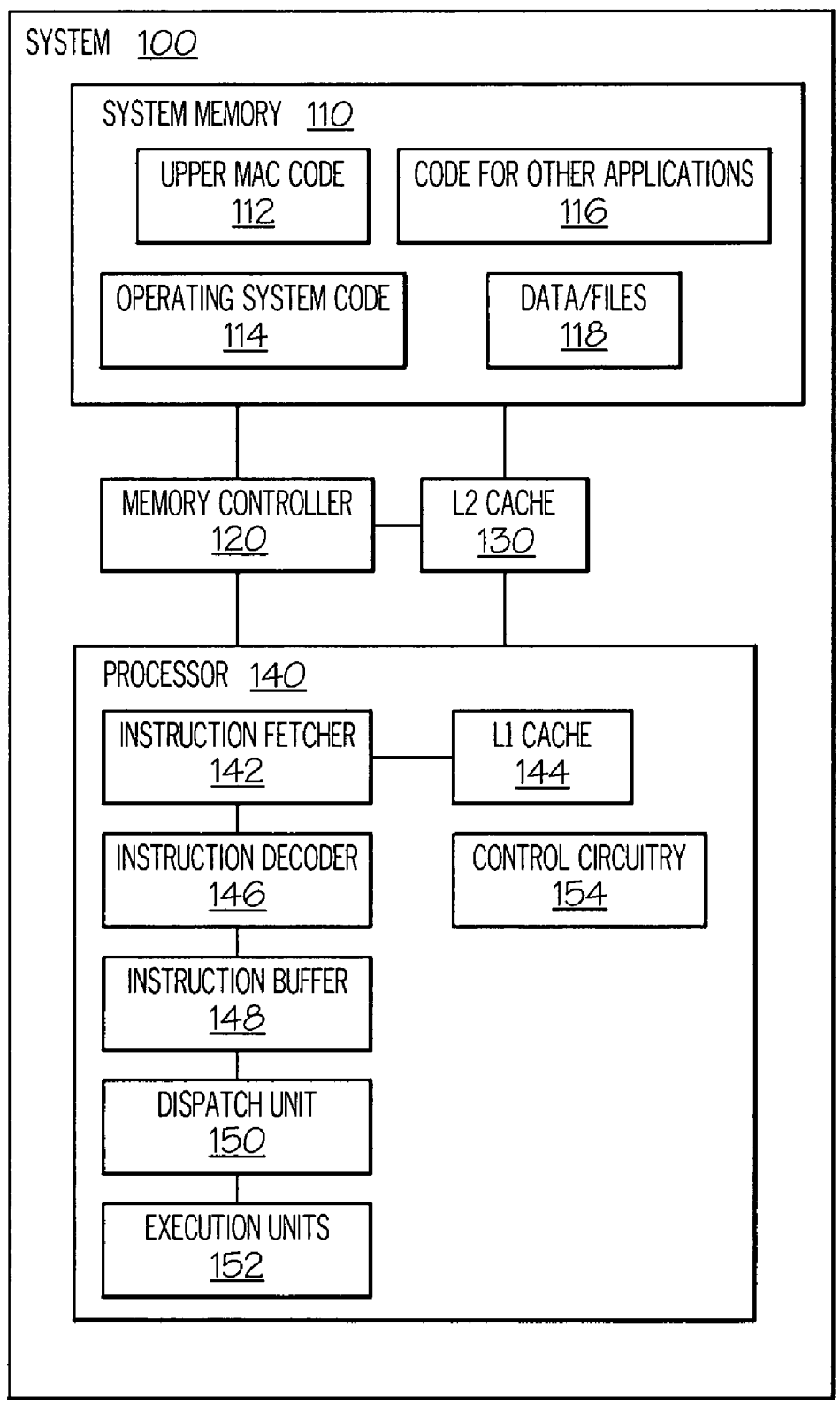
FIG. 1B depicts a processor of a computer platform capable of performing media access control and other operations.

FIG. 1B shows a view of a computer 100 encompassing CPU 162. The operation of the processor 140 of FIG. 1B is similar in both the CPU 162 and ME 166. Computer 100 comprises a system memory 110, a memory controller 120, an L2 cache 130, and a processor 140. System memory 110 comprises a hard disk drive memory (available to the CPU but not to the ME), Read-Only Memory (ROM), and Random Access Memory (RAM). System memory 110 stores Upper MAC code 112, Operating System (OS) code 114, Basic Input-Output System (BIOS) code (not shown), and code for other application programs 116. System memory 110 also stores data and files 118. The Upper MAC code 112, OS code 114, and applications code 116, are typically stored on a hard drive, whereas BIOS code is typically stored in ROM.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level 1 cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 214 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1B also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1B, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

FIG. 2 shows a flow chart of an embodiment 200 to place the PC in a low power state. In one embodiment, services running on the Host will register with the ME the list of ports their services are advertising on, the ports which will receive service requests, the name of the service (i.e. how others will search for it) and provide a search response packet to be sent in response to a search request an provide an advertisement of services periodically (element 202). Then, the ME stores the provided information in memory (element 204). Next, the PC is placed into a low power state (element 206), and the ME registers with the MAC (Media Access Control) the list of ports it should be listening to (element 208). The Upper MAC for wireless communications is implemented by the ME. The lower MAC for wireless is implemented in the LAN controller of the ICH. For non-wireless communications the entire MAC is in the ICH. At this point, the MAC is "listening" to the network to detect incoming packets on registered ports (element 210). In one embodiment, if there is nothing else for the ME to do, it can also go to sleep, thereby further reducing power consumption.

FIG. 3 shows a flow chart of an embodiment 300 for receiving and responding to network requests while the PC is in a low power state. Suppose that an incoming packet on one of the registered ports is received by the MAC (element 302). Keep in mind that in the wireless case, the Upper MAC is being implemented by the ME rather than the host processor. In the non-wireless case, the entire MAC may be implemented in the ICH. At this point, reception of a packet on the port may be sufficient; or additional processing may be required for secondary packet identification or verification. In one embodiment, the MAC wakes up the ME. In another embodiment, the ME has remained awake. Next, the MAC informs the ME of the received packet on a watched port (element 304). The ME parses the packet to determine what kind of response is appropriate (element 306). The ME retrieves a previously stored response packet corresponding to the request, makes any modifications necessary to match the search request, and sends the packet back out over the network (element 308). In one embodiment, the ME will also periodically send an advertisement when the CPU of the host system is asleep. An advertisement is a packet announcing services of the host PC.

In the wireless case, the ME 166 implements portions of the upper MAC when the PC host CPU 162 is in a low power state. The Media Access Control (MAC) data communication protocol sub-layer, also known as the Medium Access Control, is a part of the data link layer specified in the seven-layer OSI (Open Systems Interconnection) model (layer 2). It provides addressing and channel access control mechanisms that makes it possible for several terminals or network nodes to communicate within a multipoint network, typically a local area network (LAN) or metropolitan area network (MAN). The MAC sub-layer acts as an interface between the Logical Link Control sublayer and the network's physical layer. The MAC layer provides an addressing mechanism called physical address or MAC address. This is a unique serial number assigned to each network adapter, making it possible to deliver data packets to a destination within a subnetwork, i.e. a physical network without routers, for example an Ethernet network. The MAC comprises two parts: the upper MAC and the lower MAC. A portion of the upper MAC is implemented by the ME 166 when the PC CPU 162 is asleep. Otherwise, the upper MAC is implemented by the PC CPU 162 when awake. The lower MAC is implemented by the LAN driver.

In this way, devices on the network that were searching for services on the PC (such as the Intel Viiv Technology Digital Media Server or, more broadly, a UPnP Media Server) will receive a properly formed response within the timing requirements specified by the protocol. The devices searching for services have no idea that the host processor 162 of the PC 100 is in a low power state and that an alternate processor is responding to its request. When ME 166 receives an incoming request that it is unable to handle itself, for example a request to stream media, ME 166 wakes the Host CPU 162 so that it may respond appropriately. After Host CPU 162 has finished responding, inactivity timers will again bring PC 100 into a low power state and the above-described process can repeat.

Thus, embodiments provide a significant power savings. Note that most network device and service discovery protocols are chatty; meaning there is a great deal of unnecessary searching and inquiry about services without actually using the service. UPnP control points in particular will periodically search for other new devices or services on the network. Some devices do this as frequently as every 1 to 2 minutes. In addition, a computer will advertise its services periodically over the network. Thus, without embodiments as disclosed herein, PC 100 would have to remain on all day long in order to properly respond to search requests. Even with traditional Wake on LAN mechanisms, PC 100 would have to be woken so frequently, it might as well just stay on all day. Maintaining service aliveness is crucial for devices and services to remain visible on the network. Even though most search requests are not actually important, it is impossible to tell the difference between a search request initiated by a consumer who actually wants to use the service and a periodic search request initiated by a device trying to maintain an accurate map of available network services. Present embodiments allow PC 100 to sleep while the subordinate processor responds to network requests that do not require PC 100 to be awake.

Technologies such as Wake on LAN are unable to provide the same power savings as embodiments disclosed herein. First, Wake on LAN implementations require network devices to have a special added capability to wake up PC 100. When such devices want to wake PC 100, they need to already have the MAC address of PC 100 in order to generate the specially formed Wake on LAN packet to be sent. Requiring all ecosystem devices to build this awareness is a significant burden. Embodiments herein have the advantage of not adding this burden to network devices as it does not require the ecosystem of devices to be changed in any way. Also their method of communication to services on PC 100 is unchanged. In addition, this invention has the advantage of not requiring network devices to have any awareness of the PC's power state.

Furthermore, once the Wake on LAN packet is received, it always wakes PC 100, and in most cases, PC 100 will wake to respond with a single packet and then go back to sleep. This not only is wasteful of power, but it also increases the response time. As described above, protocols like UPnP would literally wake PC 100 every few minutes, in essence keeping it fully powered all the time. This invention has the advantage that it can respond to many requests without waking PC 100, which saves power and reduces response time.

One area of difficulty in the implementation of embodiments is that for wireless devices, the design of the wireless MAC is unique. The MAC is split between upper and lower portions, with the upper portion being implemented in the host platform 100 in the form of a Windows device driver. To implement some embodiments requires some capabilities that are typically implemented in the upper MAC. Thus, in order for embodiments to work in a wireless environment, portions of the upper MAC must be implemented in ME 166. This is because features such as 802.11i authentication, key derivation, AP selection and association, and connection management are all implemented in the Host OS. These capabilities are required in order to maintain an active connection on the WLAN. Thus, when PC 100 is asleep, ME 166 must perform these functions. A solution to this problem is to properly split and successfully transition control between the same functionality residing in two places. Thus, portions of the upper MAC will be implemented through ME 166 when the host processor is asleep.

Figure 4:
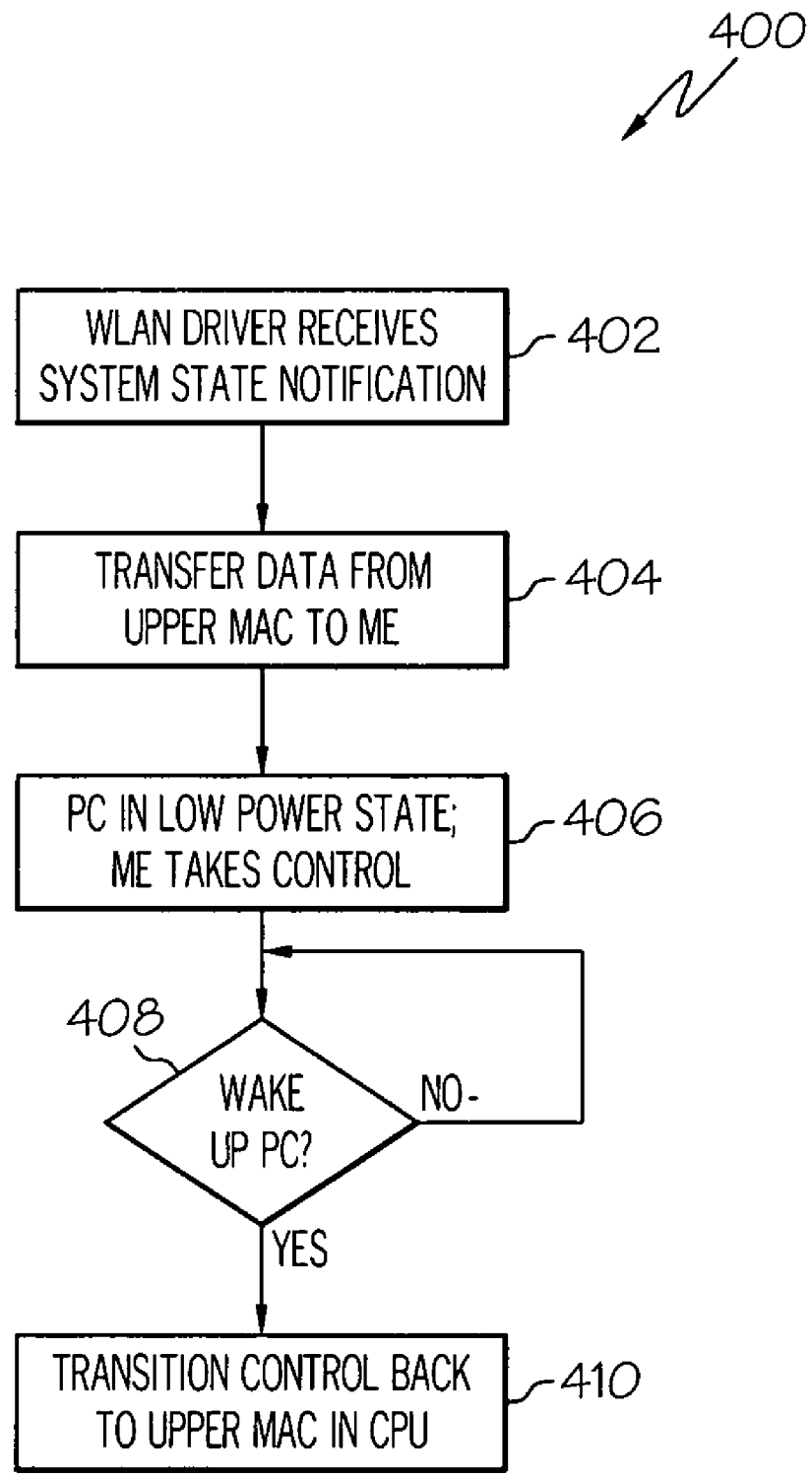
FIG. 4 depicts a flow chart of an embodiment for transferring media access control between the host PC and the ME.

FIG. 4 shows a flow chart 400 of an embodiment for doing this. When the host PC is preparing to go into a low power state, the WLAN driver will receive the S3 Advanced Configuration and Power Interface (ACPI) System State notification (element 402). The S3 ACPI system state notification is a notification the OS (Operating System) provides to applications and drivers when the system is shortly going to go into a standby power state. This power state results in powering down the CPU (that is running the OS), disk drives, and various other parts of the system. In this state, DRAM (Direct Random Access Memory) remains powered up for quickly resuming back to the active state later.

At this time, the wireless Upper MAC implemented by the CPU provides to the ME information about the current associated AP (Access Point), keys, and other connection information (element 404). Once the host PC is in a low power state, the ME takes over control of maintaining the association with the WLAN AP (element 406). When the ME decides that it needs to wake up the PC (element 408), the ME will transition control of AP association and key management back to the Upper MAC implemented in the Host PC (element 410). Note that embodiments do not require a full implementation of the Upper MAC in the ME, only those features that are necessary for maintaining an association with an AP. Thus, the ME implements a portion of the upper MAC when the host PC CPU is asleep.

Thus, some embodiments provide a method for enabling services of a computer system to appear available to other systems in a network when a Central Processing Unit (CPU) of the computer system is in a low power state. The CPU remains asleep during times when search requests are received. The ME answers these search requests according to whether the PC provides the requested service. The CPU is only awoken when data is needed from the host PC. The host PC can remain asleep until an actual request for service is received by the ME. Then the ME would awake the PC and the PC would provide the requested service.

In one embodiment, a method comprises placing the CPU in a low power state and implementing by a subprocessor, media access control to enable the subprocessor to respond to incoming network service search request packets. The subprocessor provides a response packet in response to an incoming network service search request packet. The subprocessor is located separately from the CPU but within the computer system. The subprocessor implements media access control to enable the subprocessor to respond to incoming network service search request packets when the CPU is in the low power state; wherein a service search request packet is a request to identify whether a service is provided by a device on the network and wherein a response acknowledges the availability of the searched-for service. An area of memory may be exclusively reserved for storage of data for the subprocessor, the data including software executed by the subprocessor. Media access control implemented in the subprocessor comprises monitoring different input/output (I/O) ports of the computer system.

Media access control implemented in the subprocessor also comprises evaluating requests to determine if a response can sent by the subprocessor without waking the CPU from the low power state to a higher power state. Evaluating requests to determine if a response can be sent without waking the CPU comprises determining if the request is for data that can be accessed without waking the CPU. If it is determined that a response cannot be sent without waking the CPU, then the CPU is awoken from the low power state to a higher power state. When the CPU is reawakened, the subprocessor transfers media access control from the subprocessor to the CPU.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for enabling services of a computer system to appear available to other systems in a network when a Central Processing Unit (CPU) and peripheral devices of the computer system are in a low power state, comprising:
   placing the CPU and peripheral devices in a low power state;
   by a subprocessor implemented within a memory controller hub, performing functions to respond to frequent incoming network service search request packets received from other devices in the network; wherein a service search request packet is a request to identify whether a service is provided by a device on the network; and
   by the subprocessor, providing a response packet in response to an incoming network service search request packet when the CPU is in the low power state; wherein a response packet acknowledges the availability of the searched-for service.

2. The method of claim 1, further comprising memory exclusively reserved for storage of data for the subprocessor, the data including software executed by the subprocessor.

3. The method of claim 1, wherein functions implemented in the subprocessor comprise monitoring different input/output (I/O) ports.

4. The method of claim 1, wherein functions implemented in the subprocessor comprise evaluating requests to determine if a response can be sent by the subprocessor while the CPU is in the low power state.

5. The method of claim 4, wherein evaluating requests to determine if a response can be sent while the CPU is in the low power state comprises determining if the request is for data that can be accessed while the CPU is in the low power state.

6. The method of claim 4, wherein if it is determined that a response cannot be sent while the CPU is in a low power state, then waking the CPU from the low power state to a higher power state.

7. The method of claim 6, further comprising transferring functions from the subprocessor to the CPU.

8. The method of claim 1, wherein the subordinate processor implements an upper portion of wireless media access control to provide to the subordinate processor the ability to associate access point keys and to provide other connection information.

9. A computer system appearing available to other systems in a network when a Central Processing Unit (CPU) and peripheral devices of the computer system are in a low power state, comprising:
   a CPU and peripheral devices of the computer system that can be placed in a low power state; and
   a subprocessor within a memory controller hub of the computer system that implements functions to enable the subprocessor to respond to incoming network service search request packets when the CPU is in the low power state; wherein a service search request packet is a request to identify whether a service is provided by a device on the network and wherein a response acknowledges the availability of the searched-for service.

10. The system of claim 9, further comprising memory exclusively reserved for storage of data for the subprocessor, the data including software executed by the subprocessor.

11. The system of claim 9, wherein functions implemented in the subprocessor comprise monitoring different input/output (I/O) ports.

12. The system of claim 9, wherein functions implemented in the subprocessor comprise evaluating requests to determine if a response can sent by the subprocessor while the CPU is in a low power state.

13. The system of claim 12, wherein evaluating requests to determine if a response can be sent while the CPU is the low power state comprises determining if the request is for data that can be accessed without waking the CPU.

14. The system of claim 12, wherein if the subprocessor determines that a response cannot be sent while the CPU is in a low power state, then waking the CPU from the low power state to a higher power state.

15. The system of claim 14, further comprising transferring media access control from the subprocessor to the CPU.

* * * * *